(12) United States Patent
Li et al.

(10) Patent No.: US 11,752,567 B2
(45) Date of Patent: Sep. 12, 2023

(54) CAPACITIVE DISCHARGE WELDING OF DISSIMILAR METALS

(71) Applicant: GM Global Technology Operations LLC, Detroit, MI (US)

(72) Inventors: Huaxin Li, Rochester Hills, MI (US); Cheonjae Bahk, Rochester, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 374 days.

(21) Appl. No.: 17/104,139

(22) Filed: Nov. 25, 2020

(65) Prior Publication Data
US 2022/0161352 A1    May 26, 2022

(51) Int. Cl.
*B23K 11/20* (2006.01)
*B23K 11/26* (2006.01)
*B23K 103/24* (2006.01)
*B23K 103/20* (2006.01)
*B23K 101/00* (2006.01)

(52) U.S. Cl.
CPC .............. *B23K 11/20* (2013.01); *B23K 11/26* (2013.01); *B23K 2101/006* (2018.08); *B23K 2103/20* (2018.08); *B23K 2103/24* (2018.08)

(58) Field of Classification Search
CPC ....... B23K 11/002; B23K 11/02; B23K 11/20; B23K 11/26; B23K 11/34; B23K 2101/006; B23K 2101/008; B23K 2103/04; B23K 2103/06; B23K 2103/18; B23K 2103/20; B23K 2103/24

USPC .......................................................... 219/113
See application file for complete search history.

(56) References Cited

U.S. PATENT DOCUMENTS

| | | | |
|---|---|---|---|
| 5,071,059 A * | 12/1991 | Heitman | F01D 5/18 228/244 |
| 2015/0231730 A1 * | 8/2015 | Yang | B23K 11/20 219/93 |
| 2017/0297137 A1 * | 10/2017 | Perry | C22C 9/00 |
| 2019/0076953 A1 * | 3/2019 | Schroth | B23K 26/40 |
| 2020/0114459 A1 | 4/2020 | Haselhuhn et al. | |

FOREIGN PATENT DOCUMENTS

CN         1475326 A    2/2004

\* cited by examiner

*Primary Examiner* — Dana Ross
*Assistant Examiner* — Joseph W Iskra
(74) *Attorney, Agent, or Firm* — Vivacqua Crane, PLLC

(57) ABSTRACT

A method of joining a first piece of an automotive component that is made from a first material to a second piece of the automotive component that is made from a second material includes machining a fay surface onto each of the first and second pieces of the automotive component, cleaning the fay surfaces of each of the first and second pieces of the automotive component, placing a metal filler between the fay surfaces of the first and second pieces of the automotive component, holding the first and second pieces together with the metal filler positioned between the fay surfaces of the first and second pieces, and passing an electric current through the first piece, the metal filler and the second piece to melt the metal filler and weld the first piece to the second piece.

20 Claims, 2 Drawing Sheets

CAPACITIVE DISCHARGE WELDING OF DISSIMILAR METALS

INTRODUCTION

The present disclosure relates to capacitive discharge welding, and more specifically, capacitive discharge welding dissimilar materials.

Capacitive discharge welding is a form of resistance welding that utilizes capacitors to discharge and electric current through a part. The capacitors are charged with a large amount of energy, which is selectively and rapidly released into the part. During capacitive discharge welding, the capacitors are charged. Two pieces of a part are placed in contact with one another. When the capacitors are released a large electric current passes through the two pieces. Heat generated due to the electric current passing through the two pieces, melts the two surfaces, which when solidified, forms a weld between the two pieces.

The use of light-weight materials, such as aluminum and titanium, for automotive components in automobiles has become more and more popular due to the weight and strength advantages. However, certain components, or parts of components, such as gear interfaces or high stress concentration points must still be made from steel, due to inherently higher modulus of elasticity and mechanical strength options, resulting in an improved structural performance. The challenge for the industry has been how to take advantage of both the materials together, while not compromising from the disadvantages, if any, resulting from structural joining of these two materials. Problems occur when dissimilar materials, such as steel and aluminum, are directly welded to one another, such as the formation of brittle aluminum/iron intermetallic phases.

Additionally, to create strong welds, having large surface areas, very large amounts of electric current are needed to melt the interface between two parts being welded together.

Thus, while current capacitive discharge welding processes achieve their intended purpose, there is a need for an improved capacitive discharge welding process that uses less electric current than traditional processes and creates a robust welded bond between parts made from dissimilar materials.

SUMMARY

According to several aspects of the present disclosure, a method of joining a first piece of an automotive component that is made from a first material to a second piece of the automotive component that is made from a second material, includes machining a fay surface onto each of the first and second pieces of the automotive component, cleaning the fay surfaces of each of the first and second pieces of the automotive component, placing a metal filler between the fay surfaces of the first and second pieces of the automotive component, holding the first and second pieces together with the metal filler positioned between the fay surfaces of the first and second pieces, and passing an electric current through the first piece, the metal filler and the second piece to melt the metal filler and weld the first piece to the second piece.

According to another aspect, the method further includes pressing the first piece and the second piece together at a first pre-determined force prior to passing an electric current through the first piece, the metal filler and the second piece.

According to another aspect, the method further includes pressing the first piece and the second piece together at a first pre-determined force that is between 10 Megapascals and 200 Megapascals.

According to another aspect, the method further includes pressing the first piece and the second piece together at a second pre-determined force after the metal filler has melted.

According to another aspect, the method further includes pressing the first piece and the second piece together at a second pre-determined force that is between 100 Megapascals and 500 Megapascals.

According to another aspect, the method further includes machining a flat fay surface onto each of the first and second pieces of the automotive component, wherein the flat fay surfaces are parallel to one another and oriented at an angle relative to the path of the electric current that is passed through the first piece, the metal filler and the second piece.

According to another aspect, the method further includes machining a flat fay surface onto each of the first and second pieces of the automotive component, wherein the flat fay surfaces are parallel to one another and oriented at an angle that is approximately 45 degrees relative to the path of the electric current that is passed through the first piece, the metal filler and the second piece.

According to another aspect, the method further includes forming a metal filler from a sheet of metal filler material prior to placing the metal filler between the fay surfaces of the first and second pieces of the automotive component.

According to another aspect, the method further includes forming one of a solid double ring metal filler and a single ring mesh metal filler from a sheet of metal filler material.

According to another aspect, the method further includes selecting an appropriate metal filler material based on the materials that the first and second pieces are made from.

According to another aspect, one of the first and second pieces is made from steel and the other of the first and second pieces is made from one of ductile iron and titanium, and the method further includes forming a metal filler from a sheet of an alloy having greater than 20% nickel prior to placing the metal filler between the fay surfaces of the first and second pieces of the automotive component.

According to another aspect, one of the first and second pieces is made from steel and the other of the first and second pieces is made from aluminum, and the method further includes forming a metal filler from a sheet of one of an alloy having greater than 50% nickel and a copper alloy prior to placing the metal filler between the fay surfaces of the first and second pieces of the automotive component.

According to several aspects of the present disclosure, a method of joining a ring gear that is made from a first material to a differential housing that is made from a second material includes machining a fay surface onto each of the ring gear and the differential housing, cleaning the fay surfaces of each of the ring gear and the differential housing, selecting an appropriate metal filler material based on the materials that the first and second pieces are made from, forming one of a solid double ring metal filler and a single ring mesh metal filler from a sheet of the appropriate metal filler material, placing a metal filler between the fay surfaces of the ring gear and the differential housing, pressing the ring gear and the differential housing together at a first pre-determined force that is between 10 Megapascals and 200 Megapascals, holding the ring gear and the differential housing together with the metal filler positioned between the fay surfaces of the ring gear and the differential housing, passing an electric current through the ring gear, the metal filler and the differential housing to melt the metal filler and weld the ring gear to the differential housing, wherein, the fay surfaces of the ring gear and the differential housing are parallel to one another and oriented at an angle that is approximately 45 degrees relative to the path of the electric current passing through the ring gear, the metal filler and the differential housing, and pressing the first piece and the second piece together at a second pre-determined force that is between 100 Megapascals and 500 Megapascals.

According to another aspect, the ring gear is made from steel and the differential housing is made from one of ductile iron and titanium, the method further including selecting a metal filler material that is a nickel alloy having greater than 20% nickel.

According to another aspect, the ring gear is made from steel and the differential housing is made from aluminum, the method further including selecting a metal filler material that is one of a nickel alloy having greater than 50% nickel and a copper alloy.

According to several aspects of the present disclosure, a differential housing assembly includes a differential housing made from a first material and having a fay surface machined thereon, a ring gear welded onto the differential housing, the ring gear made from a second material and having a fay surface machined thereon, and a metal filler positioned between and interconnecting the fay surface of the differential housing and the fay surface of the ring gear.

According to another aspect, the metal filler is one of a solid double ring metal filler and a single ring mesh metal filler made from a sheet of metal filler material.

According to another aspect, the differential housing and the ring gear are welded together by pressing the ring gear and the differential housing together at a first pre-determined force that is between 10 Megapascals and 200 Megapascals, holding the ring gear and the differential housing together with the metal filler positioned between the fay surfaces of the ring gear and the differential housing, passing an electric current through the ring gear, the metal filler and the differential housing to melt the metal filler and weld the ring gear to the differential housing, wherein, the fay surfaces of the ring gear and the differential housing are parallel to one another and oriented at an angle that is approximately 45 degrees relative to the path of the electric current passing through the ring gear, the metal filler and the differential housing, and pressing the first piece and the second piece together at a second pre-determined force that is between 100 Megapascals and 500 Megapascals.

According to another aspect, the ring gear is made from steel and the differential housing is made from one of ductile iron and titanium, and the metal filler is made from a nickel alloy having greater than 20% nickel.

According to another aspect, the ring gear is made from steel and the differential housing is made from aluminum, and the metal filler is made from one of a nickel alloy having greater than 50% nickel and a copper alloy.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
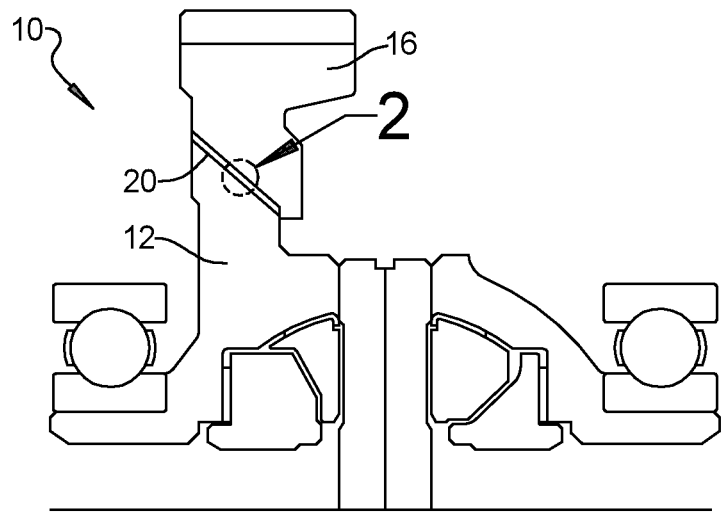
FIG. 1 is a side sectional view of a differential housing having a ring gear welded thereon according to an exemplary embodiment of the present disclosure.
Figure 2:
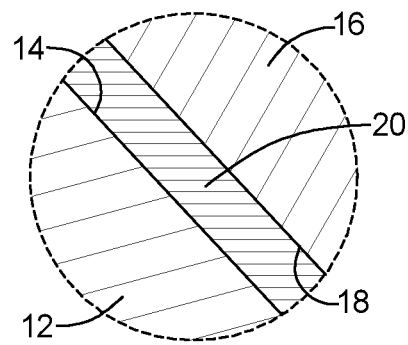
FIG. 2 is an enlarged portion of FIG. 1.

Referring to FIG. 1, a differential housing assembly 10 according to an exemplary embodiment of the present disclosure includes a differential housing 12 made from a first material and having a fay surface 14 machined thereon. A ring gear 16 is welded onto the differential housing 12. The ring gear 16 is made from a second material and has a fay surface 18 machined thereon. A metal filler 20 is positioned between and interconnects the fay surface 14 of the differential housing 12 and the fay surface 18 of the ring gear 16.

In an exemplary embodiment, the ring gear 16 is made from steel and the differential housing 12 is made from one of ductile iron and titanium. The metal filler 20 is made from a material that will bond well to both the steel ring gear 16 and the ductile iron or titanium differential housing 12. The metal filler 20 is made from a nickel alloy having greater than 20% nickel. A nickel alloy having more than 20% nickel will bond well to steel, ductile iron and titanium, and avoids the formation of brittle intermetallic compounds that would form if the steel ring gear 16 is welded directly to a ductile iron or titanium differential housing 12.

In another exemplary embodiment, the ring gear 16 is made from steel and the differential housing 12 is made from aluminum. The metal filler 20 is made from a material that will bond well to both the steel ring gear 16 and the aluminum differential housing 12. The metal filler 20 is made from one of a nickel alloy having greater than 50% nickel and a copper alloy. A nickel alloy having more than 50% nickel or a copper alloy will bond well to steel and aluminum, and avoids the formation of brittle intermetallic compounds that would form if the steel ring gear 16 is welded directly to an aluminum differential housing 12.

Figure 3:
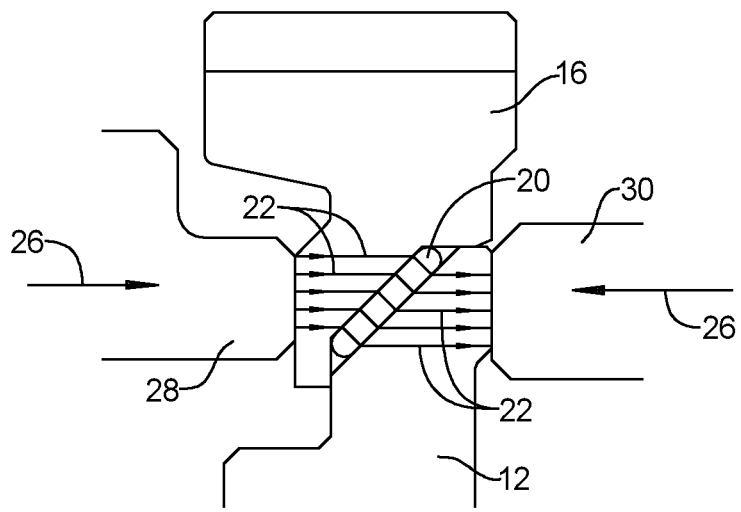
FIG. 3 is a side sectional view of a differential housing wherein an electric current is passing through the differential housing during welding of a ring gear thereon.

Referring to FIG. 3, the weld between the ring gear 16 and the differential housing 12 is formed by pressing the ring gear 16 and the differential housing 12 together with the metal filler 20 positioned between the fay surfaces 14, 18 and passing an electric current 22 through the ring gear 16, the metal filler 20 and the differential housing 12 to melt the metal filler 20 and weld the ring gear 16 to the differential housing 12. As shown in FIG. 3, a first electrode 28 contacts the ring gear 16 and a second electrode 30 contacts the differential housing 12. The electric current 22 passes from the first electrode 28 through the ring gear 16, from the fay surface 18 of the ring gear 16 through the metal filler 20 to the fay surface 14 of the differential housing 12, and through the differential housing 12 to the second electrode 30.

Figure 4A:
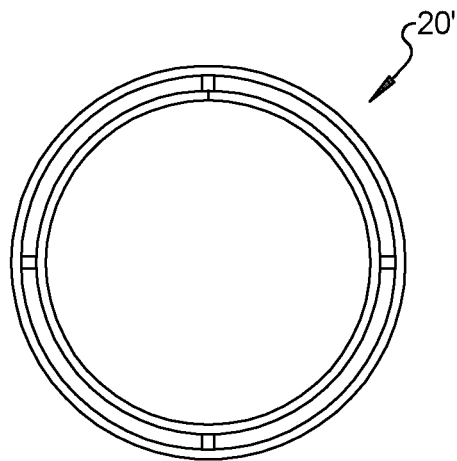
FIG. 4A is a perspective view of a solid double ring metal filler according to an exemplary embodiment.

Referring to FIG. 4A, in an exemplary embodiment, the metal filler 20 is a solid double ring metal filler 20'. The solid double ring metal filler 20' concentrates the filler material near the outer edges of the fay surfaces 14, 18 which will provide durability against the bending stresses experienced by the ring gear 16 and the differential housing 12. Additionally, by using a solid double ring metal filler 20', the electric current 22 is focused on the solid double ring metal filler 20'. The solid double ring metal filler 20' reduces the surface area that the electric current 22 passes through, thereby reducing the amount of electric current 22 needed to melt the solid double ring metal filler 20', and the contacting fay surfaces 14, 18 as compared to a metal filler 20 that covers the entire surface area of the fay surfaces 14, 18.

Figure 4B:
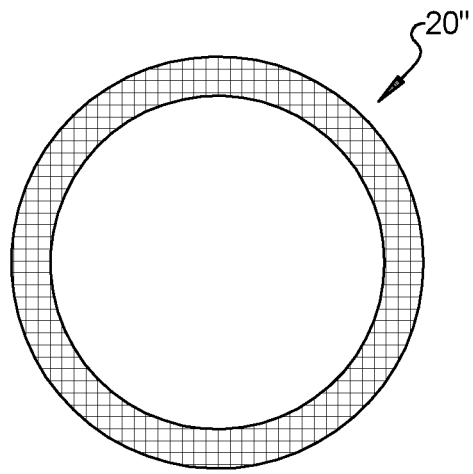
FIG. 4B is a perspective view of a single ring mesh metal filler according to an exemplary embodiment.

Referring to FIG. 4B, in another exemplary embodiment, the metal filler 20 is a single ring mesh metal filler 20". The single ring mesh metal filler 20" focuses the electric current 22 on the mesh of the single ring mesh metal filler 20". The single ring mesh metal filler 20" reduces the surface area that the electric current 22 passes through, thereby reducing the amount of electric current 22 needed to melt the single ring mesh metal filler 20", and the contacting fay surfaces 14, 18 as compared to a solid metal filler 20 that covers the entire surface area of the fay surfaces 14, 18.

The use of a solid double ring metal filler 20' or a single ring mesh metal filler 20" significantly reduces the amount of electric current needed to create the weld. For example, a current density of 0.4 kA/mm$^2$ (range 0.3-0.7 kA/mm$^2$) to melt ductile iron and steel to form a weld joint. If a solid single ring metal filler 20 is used having an outer diameter of 140 mm and an inner diameter of 120 mm, the required current would be 1633 kA. If a solid double ring metal filler 20' or a single ring mesh metal filler 20" is used, the current can be reduced by 40%. The required current would be only 980 kA. This reduction will significantly reduce machine cost and energy efficiency.

In an exemplary embodiment, the fay surfaces 14, 18 of the ring gear 16 and the differential housing 12 are parallel to one another and oriented at an angle 24 that is approximately 45 degrees relative to the path of the electric current 22 passing through the ring gear 16, the metal filler 20 and the differential housing 12. This increases the surface area of the fay surfaces 14, 18 and shortens the path of the electric current 22.

Once the fay surfaces 14, 18 and the metal filler 20 are melted, the ring gear 16 and the differential housing 12 are pressed together, as indicated by arrows 26, to form a fusion bond between the ring gear 16, the metal filler 20 and the differential housing 12, thereby welding the ring gear 16 to the differential housing 12.

Figure 5:
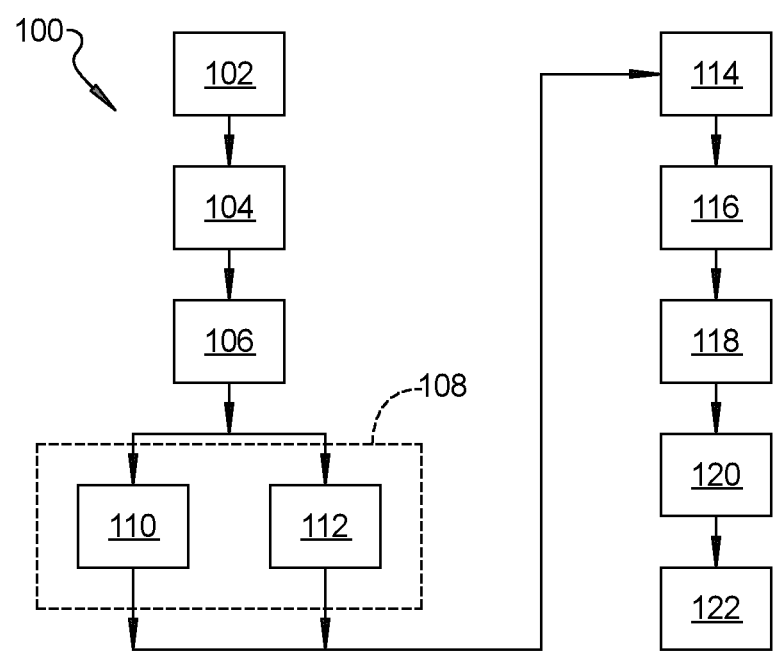
FIG. 5 is a flow chart illustrating a method of joining according to an exemplary embodiment of the present disclosure.

Referring to FIG. 5, a method 100 of joining a first piece, such as a differential housing 12, of an automotive component, such as a differential housing assembly 10, that is made from a first material to a second piece, such as a ring gear 16, of the automotive component that is made from a second material is shown.

Beginning at block 102, the method includes machining a fay surface onto each of the first and second pieces of the automotive component, and at block 104, cleaning the fay surfaces of each of the first and second pieces of the automotive component.

Moving to block 106, the method includes selecting an appropriate metal filler material based on the materials that the first and second pieces are made from. In an exemplary embodiment, one of the first and second pieces is made from steel and the other of the first and second pieces is made from one of ductile iron and titanium. An appropriate metal filler material for the metal filler is an alloy having greater than 20% nickel. In another exemplary embodiment, one of the first and second pieces is made from steel and the other of the first and second pieces is made from aluminum. An appropriate metal filler material for the metal filler is one of an alloy having greater than 50% nickel and a copper alloy.

Moving to block 108, the method includes forming one of a solid double ring metal filler 20' and a single ring mesh metal filler 20" from a sheet of the appropriate metal filler material. A solid double ring metal filler 20', as shown in FIG. 4A, may be stamped or laser cut from a solid sheet of the appropriate metal filler material. Likewise, a single ring mesh metal filler 20", as shown in FIG. 4B, may be stamped or laser cut from a mesh sheet of the appropriate metal filler material.

Moving on to block 114, the method includes placing the metal filler between the fay surfaces of the first and second pieces, and at block 116, pressing the first and second pieces together. In an exemplary embodiment, the first and second pieces are pressed together at a first pre-determined force that is between 10 Megapascals and 200 Megapascals. This ensures that the first and second pieces are pushed together, with the metal filler positioned between them, and good electrical contact is made between the first piece and the metal filler and the second piece and the metal filler.

Moving to block 118, the method includes holding the first and second pieces together with the metal filler 20 positioned between the fay surfaces, and at block 120, passing an electric current through the first piece, the metal filler 20 and the second piece to melt the metal filler 20 and weld the first piece to the second piece.

In an exemplary embodiment, the fay surfaces of the first and second pieces are parallel to one another and oriented at an angle that is approximately 45 degrees relative to the path of the electric current passing through the first piece, the metal filler 20 and the second piece. This increases the surface area of the fay surfaces and shortens the path of the electric current.

Moving to block 122, after the fay surfaces and the metal filler have been melted by heat resulting from resistance of the electric current passing through the first piece, the metal filler and the second piece, the method includes pressing the first piece and the second piece together at a second pre-determined force that is between 100 Megapascals and 500 Megapascals. This helps to form a solid fusion bond between the fay surfaces of the first and second pieces and the metal filler 20.

A method of joining a first piece, such as a differential housing 12, of an automotive component, such as a differential housing assembly 10, that is made from a first material to a second piece, such as a ring gear 16, of the automotive component that is made from a second material offers the advantage of forming a strong fusion bond between the first and second pieces that does not include brittle phases that would be formed if the first and second pieces were welded directly to one another without a metal filler. Additionally, using a solid double ring metal filler or a single ring mesh metal filler significantly reduces the amount of electric current needed to create the weld.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of joining a first piece of an automotive component that is made from a first material to a second piece of the automotive component that is made from a second material, comprising:
   machining a fay surface onto each of the first and second pieces of the automotive component;
   cleaning the fay surfaces of each of the first and second pieces of the automotive component;
   forming one of a solid double ring metal filler and a single ring mesh metal filler from a sheet of metal filler material;
   placing the metal filler between the fay surfaces of the first and second pieces of the automotive component;
   holding the first and second pieces together with the metal filler positioned between the fay surfaces of the first and second pieces; and
   passing an electric current through the first piece, the metal filler and the second piece to melt the metal filler and weld the first piece to the second piece.

2. The method of claim 1, further including pressing the first piece and the second piece together at a first predetermined force prior to passing an electric current through the first piece, the metal filler and the second piece.

3. The method of claim 1, further including pressing the first piece and the second piece together at a second predetermined force after the metal filler has melted.

4. The method of claim 3, further including pressing the first piece and the second piece together at a second predetermined force that is between 100 Megapascals and 500 Megapascals.

5. The method of claim 1, further including machining a flat fay surface onto each of the first and second pieces of the automotive component, wherein the flat fay surfaces are parallel to one another and oriented at an angle relative to the path of the electric current that is passed through the first piece, the metal filler and the second piece.

6. The method of claim 5, further including machining a flat fay surface onto each of the first and second pieces of the automotive component, wherein the flat fay surfaces are parallel to one another and oriented at an angle that is approximately 45 degrees relative to the path of the electric current that is passed through the first piece, the metal filler and the second piece.

7. A method of joining a first piece of an automotive component to a second piece of the automotive component, one of the first and second pieces made from steel and the other of the first and second pieces made from one of ductile iron and titanium, the method comprising:
   machining a fay surface onto each of the first and second pieces of the automotive component;
   cleaning the fay surfaces of each of the first and second pieces of the automotive component;
   forming a metal filler from a sheet of an alloy having greater than 20% nickel;
   placing the metal filler between the fay surfaces of the first and second pieces of the automotive component;
   holding the first and second pieces together with the metal filler positioned between the fay surfaces of the first and second pieces; and
   passing an electric current through the first piece, the metal filler and the second piece to melt the metal filler and weld the first piece to the second piece.

8. The method of claim 7, further including forming one of a solid double ring metal filler and a single ring mesh metal filler from the sheet of an alloy having greater than 20% nickel.

9. The method of claim 7, further including pressing the first piece and the second piece together at a first predetermined force prior to passing an electric current through the first piece, the metal filler and the second piece.

10. The method of claim 7, further including pressing the first piece and the second piece together at a second predetermined force after the metal filler has melted.

11. The method of claim 10, further including pressing the first piece and the second piece together at a second predetermined force that is between 100 Megapascals and 500 Megapascals.

12. The method of claim 7, further including machining a flat fay surface onto each of the first and second pieces of the automotive component, wherein the flat fay surfaces are parallel to one another and oriented at an angle relative to the path of the electric current that is passed through the first piece, the metal filler and the second piece.

13. The method of claim 12, further including machining a flat fay surface onto each of the first and second pieces of the automotive component, wherein the flat fay surfaces are parallel to one another and oriented at an angle that is approximately 45 degrees relative to the path of the electric current that is passed through the first piece, the metal filler and the second piece.

14. A method of joining a first piece of an automotive component to a second piece of the automotive component, one of the first and second pieces made from steel and the other of the first and second pieces made from aluminum, the method comprising:
   machining a fay surface onto each of the first and second pieces of the automotive component;
   cleaning the fay surfaces of each of the first and second pieces of the automotive component;
   forming a metal filler from a sheet of one of an alloy having greater than 50% nickel and a copper alloy;
   placing the metal filler between the fay surfaces of the first and second pieces of the automotive component;
   holding the first and second pieces together with the metal filler positioned between the fay surfaces of the first and second pieces; and
   passing an electric current through the first piece, the metal filler and the second piece to melt the metal filler and weld the first piece to the second piece.

15. The method of claim 14, further including pressing the first piece and the second piece together at a first predetermined force prior to passing an electric current through the first piece, the metal filler and the second piece.

16. The method of claim 14, further including pressing the first piece and the second piece together at a second predetermined force after the metal filler has melted.

17. The method of claim 16, further including pressing the first piece and the second piece together at a second predetermined force that is between 100 Megapascals and 500 Megapascals.

18. The method of claim 14, further including machining a flat fay surface onto each of the first and second pieces of the automotive component, wherein the flat fay surfaces are parallel to one another and oriented at an angle relative to the path of the electric current that is passed through the first piece, the metal filler and the second piece.

19. The method of claim 18, further including machining a flat fay surface onto each of the first and second pieces of the automotive component, wherein the flat fay surfaces are parallel to one another and oriented at an angle that is approximately 45 degrees relative to the path of the electric current that is passed through the first piece, the metal filler and the second piece.

20. The method of claim 14, further including forming one of a solid double ring metal filler and a single ring mesh metal filler from the sheet of one of an alloy having greater than 50% nickel and a copper alloy.

* * * * *